US005670567A

United States Patent [19]

Lahalih

[11] Patent Number: 5,670,567
[45] Date of Patent: Sep. 23, 1997

[54] METHOD AND COMPOSITION FOR STABILIZING SOIL AND PROCESS FOR MAKING THE SAME

[75] Inventor: Shawqui M. Lahalih, Dhahran, Saudi Arabia

[73] Assignee: King Fahd University of Petroleum and Minerals, Research Institute, Dhahran, Saudi Arabia

[21] Appl. No.: 415,634

[22] Filed: Apr. 3, 1995

[51] Int. Cl.$^6$ .................................... C08K 3/38
[52] U.S. Cl. .......................... 524/404; 524/405; 524/598; 524/650; 524/843; 524/6
[58] Field of Search .................. 524/404, 405, 524/6, 843, 598, 650

[56] References Cited

U.S. PATENT DOCUMENTS

| | | | |
|---|---|---|---|
| 3,495,412 | 2/1970 | Sakata et al. | 405/264 |
| 3,984,225 | 10/1976 | Sears et al. | 71/25 |
| 4,002,457 | 1/1977 | Sears et al. | 71/25 |
| 4,026,695 | 5/1977 | Young | 71/28 |
| 4,056,380 | 11/1977 | Thiac | 71/9 |
| 4,066,431 | 1/1978 | Ennis | 71/1 |
| 4,071,400 | 1/1978 | Jankowiak | 162/169 |
| 4,163,657 | 8/1979 | Koslow et al. | 71/27 |
| 4,293,340 | 10/1981 | Metz | 106/633 |
| 4,387,205 | 6/1983 | Zasiavsky et al. | 527/400 |
| 4,793,741 | 12/1988 | Lahalih et al. | 405/263 |

FOREIGN PATENT DOCUMENTS

| | | |
|---|---|---|
| 939893 | 1/1974 | Canada . |
| 1037468 | 8/1978 | Canada . |
| 0009822 | 4/1980 | European Pat. Off. . |
| 0028495 | 5/1981 | European Pat. Off. . |
| 0421548 A1 | 4/1991 | European Pat. Off. . |
| 1373020 | 11/1974 | United Kingdom . |

*Primary Examiner*—Paul R. Michl
*Assistant Examiner*—John J. Guarriello
*Attorney, Agent, or Firm*—David E. Dougherty

[57] ABSTRACT

A water soluble chemical composition for use as a soil stabilizer, conditioner and structuring agent includes a dispersing agent such as a polyanionic sulfonated urea-melamine formaldehyde condensate, an aggregating agent such as a non-ionic water soluble urea-formaldehyde condensate having relative weight average molecular weights between 400 to 10,000 and polydispersity between 2.5 to 10, and a basic salt like di-sodium tetra borate and/or a neutral salt like sodium chloride and a nitrogen potassium or phosphorous containing compound such as potassium nitrate, phosphoric acid, potassium dihydrogen orthophosphate and the like, wherein the ratio of urea-formaldehyde to sulfonated urea-melamine-formaldehyde is between 0.2:1 to 2.0:1 and the final solid contents of this composition is between 1–15%. These compositions are then sprayed on top of sand or soil with conventional equipment and will impart significant improvements in their mechanical properties and their erosion resistance to water and wind.

7 Claims, No Drawings

METHOD AND COMPOSITION FOR STABILIZING SOIL AND PROCESS FOR MAKING THE SAME

FIELD OF THE INVENTION

The present invention relates to soil conditioning compositions, a process for making such compositions and a method of using the same. The invention relates more particularly to an improved multipurpose soft conditioning composition which improves the compressive strength of treated soil, particularly dune sand, renders the treated soil more resistant to erosion by water and wind and at the same time enhances plant growth.

BACKGROUND OF THE INVENTION

Soil or sand erosion by wind and water is a problem in most countries, especially for those with arid climates that are characterized by low rain fall, high solar radiation, high temperature and high evaporation rates. In such countries, erosion is due to the existence of fine soil particles on the surface of the soil that are loose and poorly bonded together and then susceptible to be blown by the wind resulting in sand storms, dust clouds and even sand dune movement.

The structure of soil determines its properties such as permeability to water, porosity, crust formation, load-carrying capacity, etc. Therefore, an improved soil structure will reduce soil erosion by wind or water. It will also reduce water evaporation, increase intra- and inter particle linkages and increase the bonding strength of agglomerates so that they can sustain heavy weights. It will also increase the infiltration rate and reduction of water run-off. Improved structures are needed because weak soil and sand structure are problematic in roads and highway slopes, embankments, water channels, construction excavation banks, landing sites such as civil and military air fields, sand dunes movement, military camps, oil fields and agriculture.

To overcome the above mentioned problems, extensive research on soil stabilization by chemical means was carried out and has been reported in the literature. The various methods and chemical compositions reported by various researchers on soft stabilization typically have one or two objectives. The first objective is to improve the soil structure and the second is to improve the load-carrying capacity. These objectives can be accomplished by the addition of soft additives or soil conditioners or soil modifiers. For example, there are chemicals that perform several functions and provide significant advantages when added to soil. Some of these soft additives improve soft strength, aggregate stability and water infiltration, while others limit water adsorption, soil erosion, water evaporation, water run-off, etc. To be effective, a soil additive should also be permeable to water to allow for plant growth thus increasing water infiltration and minimizing water run-off. The soil additive should also penetrate the pores of soft grains and stabilize soil and prevent its erosion. Stabilizers should also be absorbed on the edges and surfaces of soil particles to cause bridging and promote inter particle linkages. Soft stabilizers should also provide strength to the treated soft to withstand the impact of rain in heavy storms, wind and traffic.

Therefore the ideal soil additive would be the one that can function for most soil types. The additive should be easily applied and easily dispersed in soil and it is preferred that it is water-soluble and can be easily sprayed rather than being mechanically mixed with the soil. One important requirement of soil additives is that they should be of low cost and economical. Another important consideration is that soil additives should be environmentally friendly and last long enough to allow for vegetative growth. In addition, it should not to be accumulated in the soil for long periods, and hence, should be degradable.

Notwithstanding the above, there are problems associated with existing commercial soil conditioners. First, some are expensive and are not economical to use (e.g., polyacrylamides, hydrolyzed polyacrylonitriles, vinyl acetate-maleic anhydrides, polyvinyl alcohols, polyvinyl acetates, acrylic polymers, styrene-butadiene, polyurethanes, etc.) Others are not acceptable and do not allow water infiltration in the ground because they are hydrophobic or they form a film that is impermeable to water, when sprayed on top of the soft (e.g., Bitumen, asphalts, polyvinyl acetate, polyurethane, etc. ) Still others are of limited use and only provide one or two functions. For example, styrene-butadiene provides stability to the soil, yet it does not provide any appreciable strength. Stabilizers of this category include bitumen and asphalt and urea-formaldehyde. Other additives may be toxic like those organic solvent-based additives, e.g., polyurethanes, and polyacrylamides that release the acrylamide toxic monomer and chromium lignosulfonates that release toxic chromium which has been banned in some countries.

Work on soil stabilization of sand with aqueous urea-formaldehyde resins has been carried out. For example, slow release fertilizers of urea-formaldehyde resins with ratios of urea to formaldehyde of 2.5 to 3 were shown to be suitable materials for improving sand structures. Addition of $K_2SO_4$ to slow release fertilizers of urea-formaldehyde with ratios of urea-formaldehyde 3 and $K_2O/N=1$ was characterized by a high water-holding capacity. Sandy soils were also consolidated by the use of urea-formaldehyde resins with cross-linking agents in order to prevent the urea-formaldehyde resins from leaching through the sand by decreasing its solubility to zero. For instance, sandy soils were consolidated and hardened by the use of urea-formaldehyde resins with various proportions of HCl, alum and p-toluene sulfonic acid as cross-linking agents. The injection of urea-formaldehyde resins with a solution of $H_2SO_4$ as cross-linking agent into sandy soil gave a compressive strength of 25 kg/cm$^2$. Similarly treatment of sandy soil with urea-formaldehyde resins using 9% based on the weight of soil together with calcium hydrogen phosphate monohydrate as cross-linking agents gave a compressive strength from 114 to 120 kg/cm$^2$. The cold and hot curing of urea-formaldehyde resins in sandy soil was examined and found that the optimum contents of urea-formaldehyde resins was 10 and 20% based on the weight of sand with compressive strength of 13.0 and 25.0 kg/cm$^2$ respectively.

Aqueous urea-formaldehyde resins have been used with metal sulfate, nitrate, carbonate, phosphate, and chloride together with $H_2SO_4$ as cross-linking agents for strengthening sandy soil. For example, aqueous urea-formaldehyde resin mixed with KCl and $NH_4Cl$ gave a compressive strength of 18.6 kg/cm$^2$, $CaCl_2$ and $NH_4OH$ gave a compressive strength of 28.5 kg/cm$^2$; with NaCl, gave a compressive strength of 13.0 kg/cm$^2$. Also urea-formaldehyde resins containing adducts of urea-$H_2SO_4$, urea-$H_3PO_4$ or urea-$HNO_3$ gave a compressive strength of about 25.0 kg/cm$^2$ when injected into sandy soils.

It has been found that the water resistance and stability of swelling soil aggregates were increased by treatment with an aqueous solution of urea-formaldehyde resin at 0.8–1.2% of the weight of the soil which was followed by incorporation of an aqueous solution of polyacrylic acid at 0.04–0.3% of the weight of the soil. Also aqueous solutions containing urea-formaldehyde resin and polyvinyl alcohol (PVA) in a ratio of 1:1.5 was found to stabilize the water permeable soil when added in a range of 0.5–1.0 by weight of sand with an acid solution as curing agent.

Chemical modification of urea-formaldehyde resins has also been suggested for sand stabilization, for instance copolymers of urea-phenol-formaldehyde resins with a viscosity of 8.6 cP was used for strengthening sandy soil when added in an amount of about 7.5% based on the weight of sand to give a compressive strength of 47 kg/cm$^2$. It has also been reported that copolymers of urea-furfural-formaldehyde resins gave a compressive strength of 37.0 kg/cm$^2$ when added in an amount of 5% based on the weight of sand.

Despite the voluminous research that has been reported on the use of urea-formaldehyde as soil stabilizers, serious drawbacks exist. As can be seen from the above, high application rates of urea-formaldehyde are needed to obtain reasonable load-carrying capacity for the treated soil. These application rates make this class of materials uneconomical. In addition when urea-formaldehyde resins are being used as soil stabilizers in the powder form, it is difficult to apply, and they tend to dry moist soil and make the soil difficult to compact. In addition urea-formaldehyde stabilize only a limited number of soil types.

The use of sulfonated amino formaldehyde, a polyanionic condensates, as soil stabilizers was disclosed in U.S. Pat. No. 4,793,741. These polyanionic polymers were used in combination with polyvinyl alcohol to stabilize Gatch type soil. The effect of such compositions on sandy soils like dune sands is significant. However, polyvinyl alcohol is expensive and is difficult to dissolve in water.

Therefore an object of this invention is to provide a method of stabilizing poorly bonded soils that are difficult to be aggregated like beach and dune sands. Another object of this invention is to provide a composition and a method for significantly improving the load-carrying capacity of such soils. Still a further object of this invention is to disclose a composition that is relatively free of the drawbacks mentioned above. Yet another object is to provide a relatively inexpensive and economical and an environment-friendly, easy to handle and easy to apply stabilizing chemical composition. Still another object is to provide a multipurpose chemical composition that acts as a fertilizer and a soil stabilizer.

SUMMARY OF THE INVENTION

The present invention contemplates a water-soluble polyanionic composition including a sulfonated urea-melamine formaldehyde condensate, a non-ionic water soluble resin such as urea-formaldehyde condensate, a water soluble salt like the basic salt of sodium borate, and neutral salts like potassium dihydrogen phosphate, potassium nitrate and sodium chloride and other inorganic materials like sodium montmorillonite and the like. An aqueous solution of this composition is sprayed onto the surface of the soil or mechanically admixed therewith to improve the load-bearing capacity of the treated soil. The treatment will also improve the resistance of the treated soil to erosion by water or wind, and in addition, the composition provides basic plant nutrients of nitrogen potassium and phosphorous and conditions the soil to make it more favorable for plant growth.

The compositions disclosed herein can be sprayed on the top of the soil by conventional equipment. Since the compositions have low viscosity, the aqueous solution penetrates the pores and forms strong inter particle linkages and forms strong bridges. These strong linkages are realized, because of the polyanionic nature and dispersing power of the sulfonated urea-melamine-formaldehyde polymer which coats and imparts negative charges to the soil particles resulting in reordering of the soil matrix. In addition, the aggregating power of urea-formaldehyde condensates causes the aggregation of various particles by being adsorbed on the surfaces of the soil grains and ties the various particles together. The other additives disclosed in this composition have specific functions of completing and perfecting the intra- and inter particle linkages by providing more reaction sites and cross-link the various components of the chemical composition in the soil matrix. Therefore, the collective action of the various components of this stabilizing chemical composition results in a strong soil matrix which resists erosion by water and wind and which can sustain greater loads. Therefore, the stronger soil matrix resists the erosion power resulting from the kinetic energy of failing rain drops especially in the case of thunderstorms.

DETAILED DESCRIPTION OF THE PREFERRED EMBODIMENTS OF THE INVENTION

The process for soil stabilization and conditioning, according to the present invention, wherein an aqueous solution is applied to the surface of the soil includes the following steps.

A polymeric solution is made by mixing an aqueous formaldehyde solution having a concentration ranging from about 30–50% at a temperature of between 70°–90° C. and a pH of about 10 to 12 with a urea-melamine resin so that the molar ratio of formaldehyde to urea-melamine is in the range of 2.5:1 to 4.5:1. The mixing is continued until all of the urea-melamine resin dissolves.

A sulfonating agent such as an alkali metal sulfite, bisulfite or metabisulfite is added to provide a molar ratio of sulfite group to the urea-melamine in the range of 0.8:1 to 1.2:1 and the resulting solution's temperature is maintained at about 70° to 90° C. for a period of 20 to 300 minutes.

The pH of the solution from the previous paragraph is then adjusted to about 2.5 to 4.0 by adding an inorganic acid, and the reactants polymerized for a period of 30 to 150 minutes.

The pH of the polymerized solution is then adjusted to about 7–9 by adding an alkali metal hydroxide and the solution temperature is maintained between 70° to 90° C. for about 30 to 150 minutes.

The resulting solution is cooled down to room temperature and its viscosity and solid contents are measured and recorded. This is referred to as component A of the stabilizing composition.

Urea-formaldehyde condensates are then prepared by adding urea to water and heating the solution to about 70°–90° C. Then the pH is adjusted to 8–10 by the addition of an alkali metal hydroxide. A formaldehyde aqueous solution having a concentration ranging from about 30–50% is then added. The amount of urea to formaldehyde in this step is 1:5 to 1:6. After the addition of formaldehyde the pH drops to 5–6 and is then raised to 8–9 by the addition of an alkali metal hydroxide. The mixture is heated for 25–45 minutes to get the temperature back to 70°–90° C. This is the first step of the reaction procedure where the pH is about 7–8 and the temperature is between about 70°–90° C.

The second step involves lowering the pH of the solution down to 4–5 by the addition of an inorganic acid. The reaction then continues for 25–45 minutes. The solution is then neutralized by the addition of an alkali metal hydroxide and an amount of urea is added immediately to the reaction solution. The amount of urea added is such that the overall molar ratio of urea to formaldehyde is 1:2 to 1:3. After 5 to 10 minutes of the addition of urea, the pH of the solution is between 6 and 7 while the temperature is about 70°–80° C. At this point formic acid is added until the pH is within the range of 4–5 and the temperature is between 95° to 105° C. The reaction continues from 20 to 60 minutes at these conditions after which the pH is raised to about 8–9 by the addition of an alkali metal hydroxide.

The resulting solution of urea-formaldehyde condensates is cooled and its viscosity and solid contents are measured and recorded. This solution is referred to as component B of the stabilizing composition wherein the solid contents range between 40–70% and the viscosities when measured at 20° C. range between 500 to 6500 cP.

The solution of component B has the characteristics of a slow release fertilizer where preparations with higher viscosities gave lower values of free urea when they were hydrolyzed. For example after about 50 minutes of urea-formaldehyde hydrolysis, the amount of free urea released from a solution of urea-formaldehyde having a viscosity of 560 cP was about $18 \times 10^{-3}$ gm urea/gm urea-formaldehyde compared to a urea-formaldehyde solution having a viscosity of 2500 cP where the released free urea upon hydrolysis was only $9 \times 10^{-3}$ gm urea/gm urea-formaldehyde which is half the amount of the 560 cP solution.

Gel Permeation Chromatography (GPC) technique was used to measure the weight average molecular weight ($\overline{M}w$) and the average number molecular weight ($\overline{M}n$) for the urea-formaldehyde polycondensates. The preparations with viscosities of 885 cP, 1423 cP, 2236 cP and 3050 cP have ($\overline{M}w$'s, $\overline{M}n$'s) of (4400, 870), (5330, 820), (6840, 950) and (7350, 930) respectively with $\overline{M}w/\overline{M}n$ of 5.1, 6.5, 7.2 and 7.9 respectively. It is obvious that as the degree of polymerization increases the polydispersity increases and the sample has broader distribution. Therefore the fraction of the low and high molecular weight species can be controlled by the reaction conditions and this will affect their performance as an integral component in the stabilizing chemical composition as well as their slow release characteristics.

The solution of component B is added to the solution of component A to form a soil stabilizing mixture or composition. To this mixture composition and depending on the end application of these compositions, a number of inorganic solutions containing basic salts like di-sodium tetra borate, sodium carbonate, sodium sulfite, and others but preferably di-sodium tetra borate are added. Other additives include solutions of neutral salts like sodium chloride, sodium nitrate, sodium sulfate, potassium nitrate, potassium chloride, potassium di-hydrogen orthophosphate and others but preferably sodium chloride and potassium nitrate and potassium dihydrogen orthophosphate. Additional additives can also be added, such as ammonium phosphate, phosphoric acid, tri-potassium phosphate, triethyl phosphate, di-phosphorous pentoxide, nitrogen, potassium and phosphorous ("NPK") complexes and others like carboxymethyl cellulose and the like and sodium montmorillonite clay and other clay containing soils like Marl soils and others. The composition so formed can be applied to the soil either by spraying them on top of the soil with conventional spraying equipment or by mechanically mixing them with the soil. Further the composition with various ingredients can be applied to the soil as an integrated solution in the aqueous phase or in the powder form or in combinations thereof. The compositions can be applied in any concentration ranging from 1 to 15% with an application rate ranging from 0.2% to 2% by weight of sand in case of mechanical mixing or from 5 to 250 gm/m$^2$ of treated soil in case of top soil spraying.

In addition the ratio of urea to melamine plus urea in the sulfonated urea-melamine formaldehyde should range between 0.1 to 1.0:1.0 and formaldehyde to urea plus melamine ranges between 2.5 to 4.5:1.0 and the molar ratio of sulfite group to the urea plus melamine should be in the range of 0.8 to 1.2:1.0. The weight ratio of urea-formaldehyde in the stabilizing mixture ranges between 10% to 90% but preferably between 20% and 70%. The weight ratios of other inorganic salts ranges between 0.2% to 10%.

The following examples will further illustrate the invention but are not to be construed as limiting its scope.

EXAMPLE 1

130 grams of 37% formaline solution were heated with 400 gm of water at 80° C. for 10 minutes at a pH of 10. To this solution 12.6 gm of melamine and 24 gm of urea were added simultaneously. The reaction mixture continued to react for 15 minutes at a pH of about 10 and a temperature of about 80° C. After all the urea and melamine dissolved completely, 38 gm of sodium metabisulfite were added and the pH and temperature were maintained at the same values of 10 and 80° C. respectively. The reaction continued for 60 minutes. Then the pH of the reaction mixture was lowered to 3.5 by the addition of sulfuric acid. The reaction continued at this pH and 80° C. for another hour. The pH of the solution was then raised to 9 by the addition of sodium hydroxide and the reaction continued for forty minutes at the same temperature of 80° C. After cooling to room temperature the viscosity was measured at 25° C. to give a value of 1.86 cP. The solid contents were 22.3%. The urea to urea-melamine was 0.8 to 1.0.

The above procedure was repeated for different percentages of urea ranging from 0.0% to 100%. The viscosities obtained at 25° C. for 20% concentrated solutions with urea percentages of 20%, 40%, 60%, 80% and 100% were: 4.38, 2.15, 2.0, 1.85 and 1.43 cP respectively.

EXAMPLE 2

A urea-formaldehyde polycondensate was prepared by adding 86 gm of urea to 100 gm of water. The solution was heated until its temperature reached 80° C. The pH was adjusted to 8.5 by the addition of potassium hydroxide. After the complete dissolution of urea, 627 gm of 37% formaline solution was added. The pH was maintained at 8.5 and the temperature at 80° C. The reaction continued for 30 minutes. Then the pH was brought down to 4.8 by the addition of sulfuric acid and the reaction continued for another 30 minutes. After that, the solution pH was brought up to about 7 by the addition of potassium hydroxide and 100 gm of urea were then added. After complete dissolution of urea, formic acid was added to bring the pH down again to 4.7. The reaction mixture continued to react for a certain time depending on the desired viscosity of the product. After a reaction time of 30 minutes the pH was raised to 8 by the addition of potassium hydroxide. The solid contents of the final mixture was 45%. The viscosity at 23° C. was 7.85 cP.

EXAMPLE 3

"Compressive Strength Test"

For compressive strength tests of soil, cylindrical specimens of 5 cm diameter and 10 cm long were prepared according to the following procedure. For a control specimen of dune sand, 160 gm of water were added to 1350 gm of soil. After complete mixing the soil samples became homogeneous and wet. Samples were then cast in a mold in three equal layers. Each layer was compacted by a free fall of one kg of steel mass for 15 times. Three specimens are made for each test. After the specimens were molded they were allowed to cure for 24 hours at room temperature followed by 24 hours at 70° C. Stabilized samples of dune sand were prepared by mixing 160 gm of the soil stabilizer composition solution with 8.5% solid concentration and the same procedure was followed as set forth with respect to the control. The dried samples were then tested for compressive strength using an MTS 812 testing system at a rate of 0.67 cm/min. The average of three specimens are reported. The same procedure was used for other types of soil except that different amounts of water were used. For example Marl B type soil needed almost twice as much of fluid solutions to have the specimens homogeneous and wet so they could be molded.

EXAMPLE 4

"Simulated Rain Test"

The Simulated Rain Test was used to test for the erosion resistance of soil according to the following procedure. 7 kg of soil were mixed with 0.7 kg of water till they became a homogeneous wet mix. They were then compacted in 30×30×5 cm square pans. Some of these pans were perforated at the bottom to allow for water drainage and some are without perforations. The compacted samples were allowed to dry for 24 hours at room temperature. To stabilize these samples, the soil stabilizer composition was prepared in different dilution ratios. They were then sprayed on top of soil samples at a rate of 20–100 gm/m$^2$. They were then allowed to dry at room temperature for 24 hours followed by 24 hours at 70° C. The dried samples were placed in the Rain Simulator which consists of a 35×35×35 cm over head tank and capillaries fixed in the bottom of the tank. The capillaries produce water drops equivalent to natural rain drops which is about 3 mm in diameter and they fall from a height of 2.5 meters on top of the soil samples. The soil samples can be positioned at an inclination ranging from 0.0 to 60 degree angles. The eroded samples resulting from splashing and from water run-offs is then collected and recorded. The rain fall intensity can be changed from 10 mm to 50 mm/min.

EXAMPLE 5

"Water Run-off Test"

The soil sample preparations for the water run-off tests are similar to those for the simulated rain tests. After the samples are dried, they are placed on an inclined surface of 30 degree angle. Water is then allowed to flow on top of the soil samples at a rate of 6 liters/min. for six continuous hours. At the end of the run, eroded soil was taken, dried and weighed to calculate its percentage from the original known weight of the soil. The above test is repeated for three cycles where the sample is allowed to be cured between cycles.

EXAMPLE 6

"Wind Erosion Test"

The soil samples preparations for wind erosion test are the same as those of Examples 4 and 5. The samples were then exposed to different wind velocities ranging from 0.0 to 65 km/hr striking at an angle of 30 degrees. The maximum wind velocity at which sand starts to be eroded was then recorded for different treatments at the onset of failure.

EXAMPLE 7

The three soil samples that were tested with the various soil stabilizers were: dune sand, Marl A soil and Marl B soil. The chemical composition of these soils is shown in Table 1 below.

TABLE 1

Elemental analysis of the three soil samples

| ANALYTE | DUNE SAND | MARL A | MARL B |
| --- | --- | --- | --- |
| $Al_2O_3$ | 3.41 | 2.82 | 1.49 |
| BaO | 0.03 | 0.02 | 0.11 |
| CaO | 5.77 | 15.60 | 23.57 |
| $F_2O_3$ | 0.68 | 0.68 | 0.45 |
| $K_2O$ | 1.54 | 1.00 | 0.63 |
| MgO | 0.93 | 6.29 | 18.02 |
| $Mn_2O_3$ | 0.02 | 0.02 | <0.01 |
| $Na_2O$ | 1.16 | 0.72 | 0.29 |
| $SO_3$ | 0.93 | 4.43 | 2.54 |
| $SiO_2$ | 82.8 | 60.72 | 38.26 |
| SrO | 0.03 | 0.08 | 0.07 |
| $TiO_2$ | 0.20 | 0.15 | 0.09 |
| ZnO | 0.09 | <0.01 | <0.01 |
| LIO* | 3.80 | 8.10 | 15.03 |

*loss of ignition

EXAMPLE 8

A resin solution was prepared in the same manner as in Example 1 where the mole fraction of urea to urea-melamine was 0.8 to 1.0. Doses of 0.0, 1.0, 2.0 and 3.0% based on dry weight of sand were mechanically mixed with dune sand in accordance with Example 3. The compressive strengths of the soil samples were 0.2, 6.3, 18.7 and 32.7 kg/cm$^2$ respectively. The dune sand chemical composition is shown in Table 1.

EXAMPLE 9

A resin solution was prepared in the same manner as in Example 2. Doses of this resin solution of 0.0, 1.0, 2.0, and 3.0% based on the dry weight of the sand were mechanically mixed with dune sand in accordance with Example 3. The compressive strengths of the soil samples were 0.2, 2.3, 7.4, and 19.2 kg/cm$^2$ respectively.

EXAMPLE 10

A resin solution mixture was prepared by combining equal amounts of resin solutions of Example 8 and Example 9. Doses of the mixture solution of 0.0, 1.0, 2.0, and 3.0% based on the dry weight of sand were mechanically mixed with dune sand in accordance with Example 3. The compressive strengths of the soil samples were 0.2, 9.5, 24.4, and 38.0 kg/cm$^2$ respectively.

EXAMPLE 11

A resin solution was prepared in the same manner as in Example 1 where the mole fraction of urea to urea-melamine was 0.8 to 1.0. Doses of this resin solution of 0.0, 0.65, 1.0, 1.3 and 4.0% based on dry weight of sand was mechanically mixed with another type of soil called Marl A in accordance with Example 3. The compressive strengths of the Marl A soil were: 16.4, 22.3, 29.7, 33.2, and 52.8 kg/cm$^2$ respectively. The chemical composition of Marl A is shown in Table 1.

EXAMPLE 12

A resin solution was prepared in the same manner as in Example 1 where the mole fraction of urea to urea-melamine was 0.8 to 1.0. Doses of 0.0 and 1.2% by weight of dry sand was mechanically mixed with another type of soil called Marl B in accordance with Example 3. The compressive strengths of the Marl B soil were 7.1 and 11.3 kg/cm$^2$ respectively. Marl B soil has the chemical compositions shown in Table 1.

EXAMPLE 13

A resin solution was prepared in the same manner as in Example 1 and another resin solution was prepared in the same manner as in Example 2. A mixture of equal proportion was made from those two preparations and a dose of 0.0 and 1.0% by weight of dry sand was mechanically mixed with other types of soil called Marl A and Marl B in accordance with Example 3. The compressive strengths for Marl A soil were: 15.4 and 20.2 kg/cm$^2$ respectively and for Marl B the compressive strengths were: 7.1 and 15.3 kg/cm$^2$ respectively.

EXAMPLE 14

Resin solutions were prepared in the same manner as in Example 1 where the molar ratio of urea to urea-melamine ranged from 0.2 to 1.0:1.0. More specifically resin solutions with urea percentages of 20%, 40%, 60%, 80%, 100% were made. A dose of 1.0% of each of these preparations based on dry weight of sand were mechanically mixed with dune sand in accordance with Example 3. The compressive strengths of the soil samples were: 2.6, 3.1, 4.1, 5.9, and 2.0 kg/cm$^2$ respectively.

EXAMPLE 15

A resin solution was prepared in the same manner as in Example 2. Doses of 0.0, and 1.0% based on dry weight of sand were mixed mechanically with soils type Marl A and Marl B and in accordance with Example 3. The compressive strengths for Marl A were: 15.4, and 16.9 kg/cm$^2$ respectively, and for Marl B: 7.1 and 12.5 kg/cm$^2$ respectively.

EXAMPLE 16

A resin solution was prepared in the same manner as in Example 1 where the molar ratio of urea to urea-melamine was 0.8 to 1.0. A dose of this resin solution of 1.0% by weight of dry sand was mixed with dune sand, which had sodium borate of 0.1% by weight premixed with it, and in accordance with Example 3. The compressive strength of the soil sample was 5.7 kg/cm$^2$.

EXAMPLE 17

The same resin solution of Example 16 was mixed with dune sand at a dose level of 1.0% by dry weight of sand except that sea water was used instead of fresh water. The compressive strength of the soil sample was 7.6 kg/cm$^2$.

EXAMPLE 18

The same resin solution of example 16 was mixed with dune sand at a dose rate of 1.0% by weight of sand except that sodium chloride was also pre-mixed with sand at a dose level of 0.25% by weight of sand. The compressive strength of the soil sample was 8.7 kg/cm$^2$.

EXAMPLE 19

The same solution of Example 16 was mixed with dune sand followed by equal amounts of resin solution prepared in the same way as Example 2. A dose of 1.0% of each by weight of sand was mixed with dune sand and in accordance with Example 3. The compressive strength of the soil sample was 9.4 kg/cm$^2$.

EXAMPLE 20

Example 19 was repeated except that sea water was added to the solution prepared according to Example 2. The compressive strength of this soil sample was 10.7 kg/cm$^2$.

EXAMPLE 21

Example 19 was repeated except that sodium chloride was added to the soil at a dose of 0.25% by weight of dry sand and in accordance with Example 3. The compressive strength of this soil sample was 10.1 kg/cm$^2$.

EXAMPLE 22

Example 21 was repeated except that sodium borate was added instead of sodium chloride at a dose of 0.1% by weight of dry sand and in accordance with Example 3. The compressive strength of this soil sample was 13.7 kg/cm$^2$.

EXAMPLE 23

Example 22 was repeated except that sea water was added with the solution mixture. The compressive strength of this soil was 17.2 kg/cm$^2$.

EXAMPLE 24

Example 22 was repeated except that potassium nitrate and potassium dihydrogen phosphate were premixed with sand at a dose of 1.0% for each based on weight of dry sand and in accordance with Example 3. The compressive strength of this soil sample was 29.3 kg/cm$^2$.

EXAMPLE 25

Example 24 was repeated except that phosphoric acid replaced potassium dihydrogen phosphate. The compressive strength of this soil sample was 23.4 kg/cm$^2$.

EXAMPLE 26

A resin solution was prepared in the same manner as in Example 2. A dose of 1.0% by weight of dry sand of this resin solution was mixed with a dune sand that had premixed with it 0.1% by weight of sand of sodium borate and in accordance with Example 3. The compressive strength of this soil sample was 2.5 kg/cm$^2$.

EXAMPLE 27

A resin solution was prepared in the same manner as in Example 2. A dose of 1.0% by weight of dry sand was mixed with 0.25% by weight of sodium chloride and the whole mixture was mechanically mixed with dune sand and in accordance with Example 3. The compressive strength of this soil sample was 2.4 kg/cm$^2$.

EXAMPLE 28

Example 27 was repeated except that the resin solution which was prepared according to Example 1 was used. The compressive strength was 11.6 kg/cm$^2$.

EXAMPLE 29

A resin solution mixture was made by mixing equal amounts of resin solutions prepared in the same manner as in Examples 1 and 2. A dose of this mixture of 2.0% by weight of sand was mixed with dune sand and in accordance with Example 3. The compressive strength of this soil sample was 17.3 kg/cm$^2$.

EXAMPLE 30

Example 29 was repeated except that sodium chloride was added to the mixture solution at a dose of 0.25% by weight of sand. The doses of 1.0% and 2.0% of the mixture were mechanically mixed with dune sand and in accordance with Example 3. The compressive strengths of these soil samples were 9.1 and 18.9 kg/cm$^2$ respectively.

EXAMPLE 31

Example 29 was repeated except that sodium chloride was premixed with dune sand at a dose of 0.25% by weight of sand. A dose of 2.0% of the solution was mixed with this dune sand and in accordance with Example 3. The compressive strength of this soil sample was 24 kg/cm$^2$.

EXAMPLE 32

Example 29 was repeated except that sodium borate was added to the mixture solution at a dose of 0.1% by weight of sand. Doses of 1.0% and 2.0% of the mixture by weight of sand were used with dune sand and in accordance with Example 3. The compressive strength of these soil samples were 9.2 and 17.9 kg/cm$^2$ respectively.

EXAMPLE 33

Example 29 was repeated except that sodium chloride and sodium borate were added to the mixture solution at a dose of 0.1% each by weight of sand. A dose of 1.0% of this mixture by weight of sand was used with dune sand and in accordance with Example 3. The compressive strength of this soil sample was 12.5 kg/cm$^2$.

EXAMPLE 34

Example 30 was repeated except that potassium nitrate and potassium dihydrogen phosphate were also added to the mixture solution at a dose of 1.0% each by weight of sand. Doses of 1.0% and 2.0% of the mixture solution by weight of sand were mixed with dune sand and in accordance with Example 3. The compressive strengths of these soil samples were 6.8 and 22.0 kg/cm$^2$ respectively.

EXAMPLE 35

Example 34 was repeated except that sodium chloride was replaced by sodium borate at a dose of 0.1% by weight of sand. Doses of 1.0% and 2.0% of the mixture solution were used with dune sand and in accordance with Example 3. The compressive strength of these soil samples were 6.4 and 32.6 kg/cm$^2$.

EXAMPLE 36

Example 35 was repeated except that different doses were mixed with dune sand. Doses of 1.0%, 2.0%, 3.0%, 4.0%, and 4.5% by weight of sand were used with sodium borate dose of 0.1%, and 0.25% of each of potassium nitrate and potassium dihydrogen phosphate. The compressive strength of these soil samples were: 6.2, 18.5, 35.3, 56.2, and 64.8 kg/cm$^2$ respectively.

EXAMPLE 37

Example 35 was repeated except that sodium chloride was also added to the mixture solution at a dose of 0.1% by weight of sand. A dose of 1.0% of the mixture by dry weight of sand was used with dune sand and in accordance with Example 3. The compressive strength of this soil sample was 6.9 kg/cm$^2$.

EXAMPLE 38

Resin solutions were prepared in the same manner as in Examples 1 and 2. A dose of 1.0% of each by weight of sand was mixed with dune sand that had carboxymethyl cellulose dose of 0.1% by weight of sand and in accordance with Example 3. The compressive strength of this soil sample was 22.0 kg/cm$^2$.

EXAMPLE 39

A resin solution was prepared in the same manner as in Example 1. A dose of 1.0% by weight of sand was mixed with dune sand that had 0.1% by weight of sand of carboxymethyl cellulose and in accordance with Example 3. The compressive strength of this soil sample was 15.7 kg/cm$^2$.

EXAMPLE 40

Example 39 was repeated except that bentonite was premixed with soil instead of carboxymethyl cellulose. A dose of bentonite of 0.5% and 1.0% by weight of sand was mixed with dune sand and in accordance with Example 3. The compressive strengths of these soil samples were 12.6 and 16.4 kg/cm$^2$ respectively.

EXAMPLE 41

Resin solutions were prepared in the same manner as in Examples 1 and 2. A mixture solution was made by adding equal amounts of those two resins. To a dose of 1.0% by weight of sand of this mixture was added 0.5% by weight of sand an NPK fertilizer mixture and 0.1% by weight of sand of sodium borate. The whole mixture was mechanically mixed with dune sand and in accordance with Example 3. The compressive strength of this soil sample was 7.5 kg/cm$^2$.

EXAMPLE 42

Example 41 was repeated except that NPK solid fertilizer was replaced by liquid fertilizer of NPK: (20.0:20.0:20.0). The compressive strength of this soil sample was 8.2 kg/cm$^2$.

EXAMPLE 43

Control samples from dune sand were prepared in accordance with Example 4. After the samples were cured at room temperature for 24 hours they were dried at 70° C. for another 24 hours. The samples were then exposed to water run-off test in accordance with Example 5 and to simulated rainfall test in accordance with Example 4 and to wind erosion test in accordance with Example 6. The sand erosion from the water run-off test was 2200 gm or 31.4% of total sand in just in the first 10.0 minutes of testing. The erosion from rainfall test was 3037 gm or 43.4% of total sand in just 30.0 minutes of exposure at a rainfall intensity of 12.48 cm/hr. The wind speed at the onset of sand erosion was 13.5 km/hr. The used dune sand particles sizes ranged from 0.15 to 0.21 mm in diameter.

EXAMPLE 44

Solution mixture of Example 30 was sprayed on top of dune sand at a rate of 3.5 l/m$^2$ and a dose of 50.0 gm/m$^2$ and in accordance with Examples 4 and 5. After the samples were cured, they were exposed to water run-off for six continuous hours after which there was no erosion. This test was repeated for another two six-hour cycles for the same sample after proper curing after each cycle. Again there was no soil erosion. The test was repeated for different application rates of 20.0, 30.0 and 40.0 gm/m$^2$. Samples with application rates of 30.0 gm/m$^2$ and higher showed no erosion of sand. However, erosion of 20.0 gm/m$^2$ treatment was significant where about 877 gm of sand or 12.5% of total sand was eroded in the first 10.0 minutes of the test. After the completion of the third cycle the sample with 50.0 gm/m$^2$ was then cured and exposed to simulated rainfall test in accordance with Example 4. After an exposure of 60.0 minutes under a rainfall intensity of 15.6 cm/hr., the erosion of soil by splash and water run-off were 67.4 gm or 0.96% of the total soil and 265 gm or 3.78% of the total soil respectively. The overall soil loss was 332.4 gm or 4.75% of the total soil.

EXAMPLE 45

Example 44 was repeated for the solution mixture of Example 22. After an exposure of three six-hour cycles to water run-off according to Example 5, there was no sand erosion. The sample was then cured and exposed to the simulated rainfall test according to Example 4. After an exposure of 60.0 minutes under a rainfall intensity of 13.9 cm/hr, the erosion of soil by splash was 45.3 gm or 0.65% of the total soil and from water run-off was 623 gm or 8.9% of the total soil.

EXAMPLE 46

Example 43 was repeated for a solution mixture of Example 25. The sample with an application rate of 50.0 gm/m$^2$, was then exposed to the simulated rainfall test in accordance with Example 4. The rain intensity was 23.4 cm/hr falling over an area of 900 cm$^2$ for a total time of 35 minutes. The eroded soil by splash and by water run-off was collected and dried. 321 gm of total soft was eroded after 35 minutes of continuous rain. This is about 4.6% of total soil at 13.65 cm of rainfall. The infiltration rate was 205 ml/min. compared to water run-off rate of 350 ml/min. The splash erosion was responsible for about 10.0% of the total soil loss when the soil pan was exposed at 30 degree inclination with respect to the falling min.

EXAMPLE 47

Example 44 was repeated on dune sand that was treated with the solution mixture of Example 35 at a rate of 100 gm/cm$^2$. After the sample was cured it was exposed to water erosion test in accordance with Example 5 for three cycles of 36 min., 45 min., and 240 min. respectively. The soil eroded was: 98 gm or 2.8%, 55 gm or 1.6%, and 5.0 gm or 0.14% respectively. After the water erosion test was completed, it was cured and the sample was then exposed to simulated rainfall test in accordance with Example 4. After an exposure of 60 min. to rainfall intensity of 11.34 cm/hr the splash erosion was 48 gm or 1.39% of total sand and the water runoff erosion was 289 gm or 8.1% of total sand.

EXAMPLE 48

Simulated rainfall test was conducted for dune sand treated with polyvinyl alcohol [PVA; Mwt=125,000] at an application rate of 22 gm/m$^2$ and in accordance with Example 4. After an exposure of 30 min. to a rainfall intensity of 17.46 cm/hr, the splash erosion was 73 gm or 1.0% and the water run-off erosion was 569 gm or 8.1% of total sand.

EXAMPLE 49

Example 48 was repeated except that solution of Example 30 was sprayed on top of dune sand at a rate of 3.5 l/m$^2$ and a dose of 30.0, 75.0, and 100.0 gm/m$^2$. After the samples were cured they were exposed to simulated rainfall in accordance with Example 4. After an exposure of 30.0 min. to a rainfall intensity of 12.0 cm/hr, the splash erosion and water run-off erosion for treatment with dose of 75 gm/m$^2$ were: 51.0 gm and 268 gm respectively. Similarly, the splash erosion and water run-off erosion for treatment with dose of 100.0 gm/m$^2$ were: 45 gm and 205 gm respectively. However, treatment with dose of 30.0 gm/m$^2$ was treated differently. First, it was subjected to water run-off test in accordance with Example 5. After three 6-hour cycle of water run-off, there was no erosion, the sample was then cured and exposed to the simulated rainfall test in accordance with Example 4. The splash erosion and water run-off erosion were 25.0 gm and 290.0 gm respectively for a rain intensity of 13.87 cm/hr.

EXAMPLE 50

Dune sand was placed in 20.0 cm diameter circular trays in hump-like shapes to simulate sand dunes. The trays were then sprayed with the solution of Example 30 at a rate of 4 l/m$^2$ and an effective stabilizer dose of 0.0, 5.0, 10.0, 15.0, and 20.0 gm/m$^2$. The sprayed sand humps have an estimated area of 0.036 m$^2$. One additional circular tray was sprayed with polyvinyl alcohol (PVA) of molecular weight of 125, 000 at a dose of 5.0 gm/m$^2$. Another circular tray was filled with dry dune sand and tested as is. After the trays were cured they were exposed to wind erosion test in accordance with Example 6. The wind speeds at which erosion of sand started to occur were: 13.5 km/hr for the untreated sand (control), and 53.5 km/hr for the PVA treatment. The other treatments of doses of 0.0, 5.0, 10.0, 15.0, and 20.0 gm/m$^2$ had onset of erosion at wind speeds of: 40.0, 51.0, 58.0, 59.0, and 60.0 km/hr respectively.

The previous Examples are presented to illustrate the preferred embodiments of the present invention. For example, Examples 1 and 2 present the detailed chemical preparation procedure of the two main components of the chemical composition of this invention. Examples 3 to 6 present the tests used to evaluate the performance of the various compositions and their effect on different soil types. Elemental analysis of some of the tested soils is presented in Table 1 of Example 7. This table shows the wide variations in the chemical composition of these soils. Of particular interest is the concentration of silicon dioxide and calcium oxide, where silicon dioxide ranges between about 38% for Marl B to about 83% for dune sand, while calcium oxide ranges between 24% for Marl B to about 6% for dune sand. This wide variation in chemical composition allows for a true test of the versatility and effectiveness of the new compositions.

Examples 8 and 9 show the effect of the main two components (i.e. component A, which is a sulfonated urea-melamine-formaldehyde condensate, and component B, which is a urea-formaldehyde condensate), on the compressive strength of dune sand when these components are used as separate entities. However, these components show superior performance when they are used together, as one integral mixture, as can be seen from Example 10 and Examples 8 and 9. For example, a dose of 1% of the mixture with dune sand improves its compressive strength by at least 50% compared to the samples that were treated with component A alone (Example 8) and up to about 400% compared to the samples treated with component B alone (Example 9).

Examples 11, 12, 13, and 15 show that the composition mixture and its components have a significant effect on all types of soil. For example, an application dose of 1.0% by weight of sand of each of the composition mixture, component A, and component B improve the compressive strength of dune sand by a factor of: 47.5, 31.5, and 11.5 respectively and the improvement of Marl A by a factor of: 1.3, 1.8 and 1.1 respectively and the improvement of Marl B by a factor of: 2.15, 1.59 and 1.76 respectively.

Example 14 demonstrates the effect of the percent of urea in the composition of component A on the performance of this component in improving the compressive strength of the treated dune sand. From an economical and agronomical point of view, it is desirable to have a high percentage of urea in the composition, because urea is among the cheapest commodity chemicals and it is the main source of nitrogen for plants. Example 14, therefore, shows that the optimum percentage of urea for improving the compressive strength of the treated sand is about 80%. This makes this product very economical. Also in addition to its main function as a soil stabilizer and conditioner this product is a significant source of nitrogen for plants.

Examples 16 to 40 are presented to demonstrate the effect of other additives on the stability of the soil. In addition, these examples illustrate the effect of the method of application in terms of: application rates, application procedures and the order of addition of the various components to the soft to be treated. These examples help to establish the optimum procedure and preparation conditions in order to prepare the optimum chemical composition. They also help to establish the optimum methodology of applying the claimed chemical compositions to stabilize various soils.

To illustrate further, Examples 19 and 22 demonstrate clearly the effect of sodium borate additive in improving the compressive strength of dune sand by about 50%.

Examples 20 and 21 show the effect of sea water and calcium chloride which improve the compressive strength by about 10%. The addition of potassium nitrate and potassium dihydrogen phosphate to dune sand improves its strength by about 200% as can be seen from Examples 22 and 24. Phosphoric acid and potassium nitrate improve the compressive strength of dune sand by about 70% as can be seen from Examples 22 and 25.

Examples 19 to 25 show the improvement in compressive strength of the treated dune sand when the various composition constituents are added to it in separate entities. However, more significant effects can be realized if these components are combined together in one integral composition as illustrated in Examples 29 to 37.

Example 29 shows an advantage of 84% over Example 19. In Example 19, dune sand was treated with component A and component B as separate entities, while in Example 29, the dune sand was treated with a combined composition of component A and B. Moreover, the addition of the other proposed additives to this combined composition as one integral composition enhances its effectiveness as a stabilizing chemical composition. For example, the addition of sodium chloride with the stabilizing mixture improves the compressive strength of sand by almost a factor of two or more as can be seen from Examples 21, 30 and 31. Similarly the addition of sodium borate to the mixture results in 30% improvement in compressive strength as can be seen from comparing Examples 22 and 32. The addition of potassium nitrate and potassium dihydrogen phosphate to the mixture also improves the compressive strength very significantly as can be seen from Examples 34 to 37. Finally, other additives can also be added to the mixture and this results in significant improvements in compressive strengths. Carboxymethyl cellulose and sodium montmorillonite (i.e., bentonite) effects are presented in Examples 38, 39, and 40 where significant improvements in compressive strengths are realized.

Examples 43 through 50 demonstrate the effectiveness of the stabilizing composition of this invention in stabilizing dune sands against simulated natural weathering factors like erosion by water run-off, rainfall, and winds. The effect of these three factors on untreated dune sands (i.e., controls) is shown in Example 43 where severe erosion of sand can be seen taken place in a very short time of testing. For example, the erosion caused by water run-off was reduced from 2200 gm for the control sample to zero gm when the sand sample was treated with as low as 30 gm/m$^2$ of the disclosed chemical composition as can be seen from Examples 43 and 44. Similarly the erosion caused by the kinetic energy of rainfall drops was reduced from 3037 gm for the control to about one tenth of that when the samples were treated with about 50 gm/m$^2$ of the composition of this invention as can be seen from Examples 43, 44, 45, and 46. The effectiveness of these compositions against wind erosion is illustrated in Examples 43 and 50, where the onset of erosion that took place at wind speeds of about 13.5 km/hr for the control samples have been improved to more than 50 km/hr with a treatment with my composition as low as 5 gm/m$^2$ as demonstrated by Examples 43 and 50. Finally comparison of the performance of the presently disclosed chemical compositions versus well publicized and recommended commercial stabilizing agent, polyvinyl alcohol, which is very expensive compared to the disclosed material, is shown in Examples 46, 48, and 50. Example 46 and 48 show the sand erosion by rainfall is twice as much when the sand is treated with polyvinyl alcohol than when it is treated with my compositions. Example 50 also shows that the disclosed material is just as effective in stabilizing sand as polyvinyl alcohol at the dose level of 5 gm/$^2$ for both treatments. However, the presently disclosed material is about four times cheaper than polyvinyl alcohol.

While the examples have been limited to urea and melamine as a representative amine compound, it is obvious that other amines and polyamines can also be used. However, urea is preferred since it is commodity and relatively inexpensive. Similarly, other aldehydes may be used in place of formaldehyde, but formaldehyde is preferred for those types of products and applications.

While the invention has been described in connection with its preferred embodiments, it is be recognized that changes and modifications may be made therein without departing from the scope of the appended claims.

What is claimed is:

1. A water soluble chemical composition for use as a soil stabilizer, conditioner and structuring agent comprising sulfonated urea-melamine formaldehyde condensate, a urea-formaldehyde condensate having a weight average molecular weight (Mw) ranging from about 4400 to about 10,000 and polydispersity ($M_w/M_n$) of 2.5 to 10, and an inorganic salt selected from the group consisting of di-sodium tetraborate, sodium carbonate, sodium sulfite, sodium chloride, sodium nitrate, sodium sulfate, potassium nitrate, potassium chloride, phosphoric acid, and potassium di-hydrogen orthophosphate, and mixtures thereof, and wherein the ratio of urea-formaldehyde to sulfonated urea-melamine-formaldehyde is between 0.2:1 to 2.0:1 and said composition having a solids content of between 1–15%.

2. A water soluble chemical composition for use as a soil stabilizer, conditioner and structuring agent according to claim 1 which includes a material selected from the group consisting of di-sodium tetraborate, sodium chloride, potassium nitrate, phosphoric acid and potassium di-hydrogen orthophosphate.

3. A water soluble chemical composition according to claim 1 wherein the molar ratio of formaldehyde to urea-melamine in the sulfonated urea-melamine formaldehyde component is in the range of 2.5:1 to 4.5:1.0.

4. A water soluble chemical composition for use as a soil stabilizer, conditioner and structuring agent according to claim 1 wherein the overall molar ratio of formaldehyde to urea in the urea-formaldehyde component is in the range of 2:1 to 3:1.

5. A water soluble chemical composition according to claim 1 which includes a sulfonating agent selected from the group consisting of alkali metal sulfite, bisulfite and metabisulfite in an amount to provide a molar ratio of sulfite to urea-melamine in the sulfonated urea-melamine formaldehyde component in the range of 0.8:1 to 1.2:1.0.

6. A water soluble chemical composition according to claim 1 wherein the molar ratio of urea to urea-melamine is in the range of 0.2:1 to 1.0:1.

7. A multipurpose soil stabilizing and conditioning composition prepared by a process which includes the following steps:

(a) forming a polymeric solution by adding a urea-melamine resin to an aqueous formaldehyde solution having a concentration from about 30–50% at a temperature of between 70°–90° C. and a pH of about 10 to 12 so that the molar ratio of formaldehyde to urea-melamine is in the range of 2.5:1 to 4.5:1 and mixing until all of the urea-melamine resin dissolves;

(b) adding an alkali metal sulfite, bisulfite or metabisulfite to the polymeric solution of paragraph (a) to provide a molar ratio of sulfite group to the urea-melamine in the range of 0.8:1 to 1.2:1 and maintaining the resulting solution temperature at about 70° C. to 90° C. for a period of 20 to 180 minutes;

(c) adding an inorganic acid to the solution from step (b) to thereby adjust the pH of the resulting solution to about 2.5 to 4.0 and allowing the reactants to polymerize for a period of 30 to 150 minutes;

(d) adjusting the pH of the polymerized solution from step (c) to about 7–9 by adding an alkali metal hydroxide and maintaining the solution temperature at between 70°–90° C., for about 30 to 150 minutes to thereby form a component;

(e) forming a urea-formaldehyde condensate by adding urea to water and heating up the solution to about 70°–90° C. and adjusting the pH to 8–10 by the addition of an alkali metal hydroxide;

(f) forming an aqueous formaldehyde solution having a concentration from about 30–50% and adding the aqueous formaldehyde solution to the solution from (e) so that the amount of urea to formaldehyde is 1:5 to 1:6 to thereby drop the pH to 5 to 6 and then adjusting the pH to 8–9 by the addition of an alkali metal hydroxide and heating the resulting solution for 25–45 minutes to bring the temperature to between 70°–90° C. and the pH within the range of 7–8;

(g) dropping the pH of the reaction solution obtained in (f) to between 4 and 5 by the addition of an inorganic acid, allowing the reaction to continue for 25–45 minutes and then neutralizing the solution by adding an alkali metal hydroxide and thereafter adding an amount of urea in an amount such that the overall molar ratio of urea to formaldehyde is 1:2 to 1:3 and allowing the pH of the solution to reach between 6 and 7 while the temperature is about 70°–80° C.;

(h) adding formic acid to the solution of (g) to drop the pH to about 4–5 and allowing a reaction to continue from 20 to 60 minutes until the temperature is within the range of 95° to 105° C. and subsequently adding an alkali metal hydroxide to raise the pH to between 8 and 9;

(i) adding the solution obtained in (h) to the solution obtained in (d) and adding a salt selected from the group consisting of di-sodium tetraborate, sodium chloride, potassium nitrate, phosphoric acid and potassium di-hydrogen orthophosphate, and mixtures thereof, to thereby form an intermediate composition having a ratio of urea-formaldehyde to sulfonated urea-melamine-formaldehyde of between 0.2:1 to 2.0:1; and wherein a solution produced herein has a solid content of between 20 and 45%; and (j) diluting the composition with water to a solid content of 1 to 15% to form the multipurpose soil stabilizing and conditioning composition.

* * * * *